(12) United States Patent
Jiang et al.

(10) Patent No.: US 8,509,574 B2
(45) Date of Patent: Aug. 13, 2013

(54) FARADAY ROTATOR AND ISOLATOR

(71) Applicant: AdValue Photonics, Inc., Tucson, AZ (US)

(72) Inventors: Shibin Jiang, Tucson, AZ (US); Jihong Geng, Tucson, AZ (US); Zhuo Jiang, Tucson, AZ (US); Tao Luo, Tucson, AZ (US)

(73) Assignee: AdValue Photonics, Inc., Tucson, AZ (US)

( * ) Notice: Subject to any disclaimer, the term of this patent is extended or adjusted under 35 U.S.C. 154(b) by 0 days.

(21) Appl. No.: 13/708,787

(22) Filed: Dec. 7, 2012

(65) Prior Publication Data

US 2013/0129272 A1 May 23, 2013

Related U.S. Application Data

(63) Continuation-in-part of application No. 13/172,623, filed on Jun. 29, 2011, and a continuation-in-part of application No. 12/778,712, filed on May 12, 2010, now Pat. No. 8,374,468, and a continuation-in-part of application No. 12/628,914, filed on Dec. 1, 2009, now Pat. No. 8,346,029.

(51) Int. Cl.
*G02B 6/00* (2006.01)

(52) U.S. Cl.
USPC .............................. 385/11; 385/142; 385/144

(58) Field of Classification Search
None
See application file for complete search history.

(56) References Cited

U.S. PATENT DOCUMENTS

| 3,756,690 | A | * | 9/1973 | Borrelli et al. | ............... 385/1 |
|---|---|---|---|---|---|
| 3,935,020 | A | * | 1/1976 | Deeg et al. | ............... 501/51 |
| 5,087,984 | A | * | 2/1992 | Heiney et al. | ............... 359/282 |
| 5,400,418 | A | * | 3/1995 | Pearson et al. | ............... 385/11 |
| 7,715,094 | B2 | * | 5/2010 | Tokura et al. | ............... 359/341.5 |
| 7,951,735 | B2 | * | 5/2011 | Weber et al. | ............... 501/73 |
| 2005/0225815 | A1 | * | 10/2005 | Patel et al. | ............... 359/1 |
| 2005/0225839 | A1 | * | 10/2005 | Patel et al. | ............... 359/333 |

* cited by examiner

*Primary Examiner* — Uyen Chau N Le
*Assistant Examiner* — Chris Chu
(74) *Attorney, Agent, or Firm* — Dale F. Regelman; Nikia L. Gray; Quarles & Brady LLP

(57) ABSTRACT

An all-fiber optic Faraday rotator and isolator is presented. The device has a multicomponent glass optical fiber having a core having a first doping concentration of 55%-85% (wt./wt.) of a first rare-earth oxide and a cladding having a section doping concentration of 55%-85% (wt./wt.) of a second rare-earth oxide, where the first rare-earth oxide and the second rare earth oxide are one or more of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$, and where the refractive index of the cladding is lower than a refractive index of the core. The fiber optic device further includes multiple magnetic cells each formed to include a bore extending there through, where the fiber is disposed in the bore of one of the magnetic cells.

22 Claims, 14 Drawing Sheets

FARADAY ROTATOR AND ISOLATOR

CROSS REFERENCE TO RELATED APPLICATIONS

This application is a Continuation-In-Part of U.S. patent application Ser. No. 13/172,623, filed Jun. 29, 2011 and titled "All Fiber Optical Isolator," which is a Continuation-In-Part of U.S. patent application Ser. No. 12/778,712, filed May 12, 2010 and titled "Highly Rare-Earth Doped Fiber Array," which is a Continuation-In-Part of U.S. patent application Ser. No. 12/628,914, filed Dec. 1, 2009 and titled "Highly Rare Earth Doped Fiber." Priority to the forgoing applications is claimed under 35 U.S.C. §120 and the contents of each is incorporated by reference herein in their entirety, for all purposes.

STATEMENT REGARDING FEDERALLY SPONSORED RESEARCH OR DEVELOPMENT

This invention was made with government support under contract No. FA9451-12-D-0182. The government has certain rights in the invention.

TECHNICAL FIELD

The present invention relates to fiber-optic based Faraday rotators and, more particularly, to Faraday rotators, fiber-optic isolators and fiber-optic polarization rotators utilizing highly rare-earth doped optical fibers.

BACKGROUND

Faraday rotation, or the Faraday effect, is a magneto-optical phenomenon that, as a result of interaction between light and a magnetic field in a medium, causes a rotation of a polarization vector of light wave by a degree that is linearly proportional to the strength of a component of the magnetic field collinear with the direction of propagation of light. For example, the Faraday effect causes left and right circularly polarized light waves to propagate at slightly different speeds, a property known as circular birefringence. A given linear polarization vector can be presented as a composition of two circularly polarized components, the effect of a relative phase shift, induced by the Faraday effect onto the linearly polarized light wave, is to rotate the orientation of the light wave's vector of linear polarization.

The empirical angle of rotation of a linear polarization vector of a light wave is given by $\beta=VBd$, where $\beta$ is the angle of rotation (in radians), V is the Verdet constant for the material through which the light wave propagates, B is the magnetic flux density in the direction of propagation (in teslas), and d is the length of the path (in meters). The Verdet constant reflects the strength of the Faraday effect for a particular material. The Verdet constant can be positive or negative, with a positive Verdet constant corresponding to a counterclockwise rotation when the direction of propagation is parallel to the magnetic field. The Verdet constant for most materials is extremely small and is wavelength-dependent. Typically, the longer the wavelength of light, the smaller the Verdet constant. It is appreciated that a desired angle of rotation can be achieved at a shorter distance during propagation through a material in which the Verdet constant is high.

The Faraday effect allows for the construction of a Faraday rotator, which is a principal component of a Faraday isolator, a device that transmits light in only one direction. Faraday rotators and Faraday isolators of the related are bulk, stand-alone devices that are not well suited for optical integration (such as, for example, integration with waveguide-based or fiber-optic based components) and, when incorporated into an integrated optical system, require free-space optical coupling with other components of the integrated system, thereby limiting a degree of the system miniaturization and causing coupling losses.

SUMMARY OF THE INVENTION

In one implementation an all-fiber optic Faraday rotator and isolator is presented. The device has a multicomponent glass optical fiber having a core having a first doping concentration of 55%-85% (wt./wt.) of a first rare-earth oxide and a cladding having a second doping concentration of 55%-85% (wt./wt.) of a second rare-earth oxide, where the first rare-earth oxide and the second rare earth oxide are one or more of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$, and where the refractive index of the cladding is less than a refractive index of the core. The fiber optic device further includes multiple magnetic cells each formed to include a bore extending there through, where the fiber is disposed in the bore of one of the magnetic cells.

In another implementation a fiber-optic device having a light path devoid of free-space regions is presented. The device includes first and second multicomponent glass optical fibers each having a core having a first doping concentration of 55%-85% (wt./wt.) of a first rare-earth oxide, and a cladding having a second doping concentration of 55%-85% (wt./wt.) of a second rare-earth oxide, where the first rare-earth oxide and the second rare earth oxide are selected from the group consisting of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$ and the refractive index of the cladding is less than a refractive index of the core. The device further includes multiple magnetic cells each formed to include a bore extending there through, where the first fiber is disposed in the bore of one magnetic cell and the second fiber is disposed in a bore of another magnetic cell.

In yet another implementation a method for operating a fiber-optic device having a light path devoid of free-space regions is presented. The method includes transmitting light through a fiber-optic device having a light path devoid of free-space regions. The fiber-optic device used includes a multicomponent glass optical fiber having a core having a first doping concentration of 55%-85% (wt./wt.) of a first rare-earth oxide and a cladding having a second doping concentration of 55%-85% (wt./wt.) of a second rare-earth oxide, where the first rare-earth oxide and the second rare earth oxide are one or more of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$, and where the refractive index of the cladding is less than a refractive index of the core. The fiber optic device further includes multiple magnetic cells each formed to include a bore extending there through, where the fiber is disposed in the bore of one of the magnetic cells.

In certain implementations of the foregoing implementations, the multiple magnetic cells are positioned such that each has the same magnetic orientation. In yet other embodiments the magnetic cells are positioned such that they have the opposite magnetic orientation. In still other embodiments the magnetic cells are positioned such that some have the same magnetic orientation and others have opposition orientation.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF SPECIFIC EMBODIMENTS

Figure 1A:
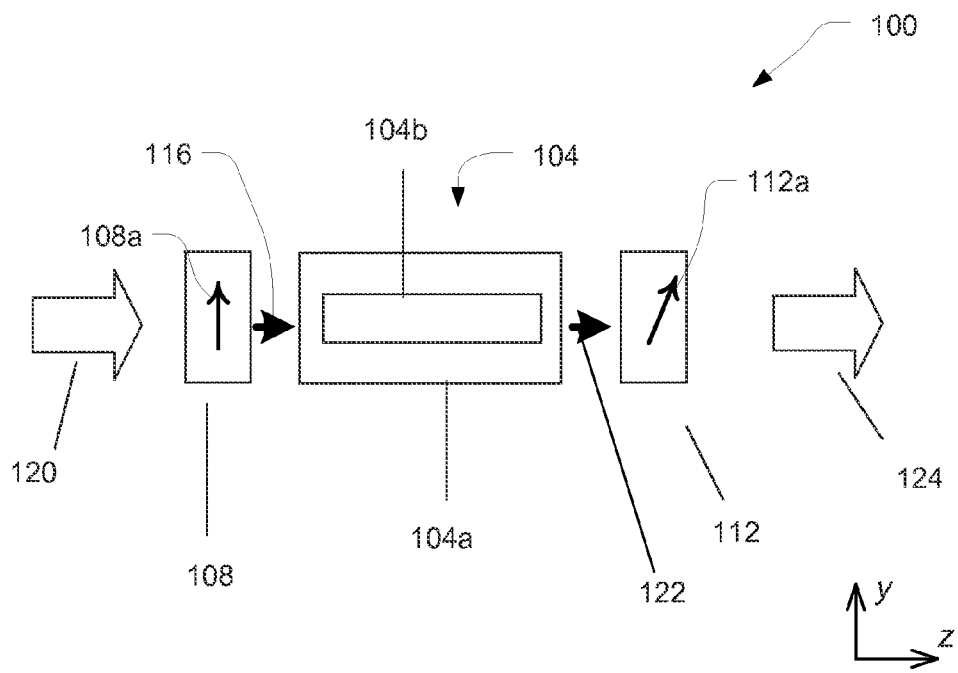
FIG. 1A is a schematic of an exemplary prior art free-space Faraday isolator.

Implementations propose the use of a plurality of magnets in a multi-segmented Faraday rotator. Throughout the following description, this invention is described in reference to specific embodiments and related figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the terms "in one embodiment, "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention that are being discussed.

An optical isolator is a device that allows light to be transmitted in only one direction. A Faraday isolator is a specific type of optical isolator that employs a Faraday rotator, which is a magneto-optical device varying the polarization of light traversing a medium that is exposed to a magnetic field.

A Faraday isolator is polarization dependent and includes a Faraday rotator device sandwiched between two optical polarizers. A simple illustration of the operation of a Faraday isolator is offered in reference to FIG. 1A, showing a conventional embodiment of a Faraday isolator 100 employing a free-space Faraday rotator device 104 (including a cell 104a creating a magnetic field throughout thereof, and a material 104b appropriately chosen to have a high Verdet constant) and input and output linear polarizers 108 and 112 (denoted so in reference to a direction of forward propagation of light, z-axis), having respective transmission axes shown with arrows 108a, 112a.

A portion 116 of input light 120, having a linear polarization parallel to the vector 108a, upon passing through the input polarizer 108, is coupled into the rotator device 104. The Faraday rotator 104 rotates the vector of polarization of light 116 by, typically, 45 degrees and passes the output light 122 towards the output polarizer (also referred to as analyzer) 112. A component, of light 122, having polarization collinear with the transmission axis 112a, emerges at an output of the polarizer 112 as light 124. Any light beam propagating in the opposite direction (i.e., in the −z direction), for example, back-reflected light, is rotated an additional forty-five (45) degrees when it passes through the Faraday rotator 104 a second time, thereby emerging from the rotator 104 with a polarization vector that is orthogonal to the transmission axis of the polarizer 108. The polarizer 108, therefore, blocks the back-reflected light. When the polarization vector of input light 120 is aligned to be parallel to the transmission axis 108a, and when the transmission axis 112a is aligned to be parallel to the rotated vector of polarization of light 122, emerging from the Faraday rotator 104, the attenuation of light upon the propagation through the Faraday isolator 100 is minimized.

Typically, a Faraday rotator such as the Faraday rotator device 104 includes a terbium gallium garnet (TGG) crystal or terbium-doped glass (element 104b of FIG. 1A) inserted into a magnetic tube (element 104a of FIG. 1A). Terbium gallium garnet (TGG), has one of the highest Verdet constants of −40 rad/T·m at 1064 nm.

It is appreciated that the magnetic flux density of the magnetic tube 104 should be strong enough to produce a forty-five (45) degree polarization rotation when the light passes through the Faraday rotator 104. In some conventional embodiments, the magnetic tube 104a is made of a ferromagnetic material, while other related art employs a tube of any material exposed to a magnetic field.

Figure 1B:
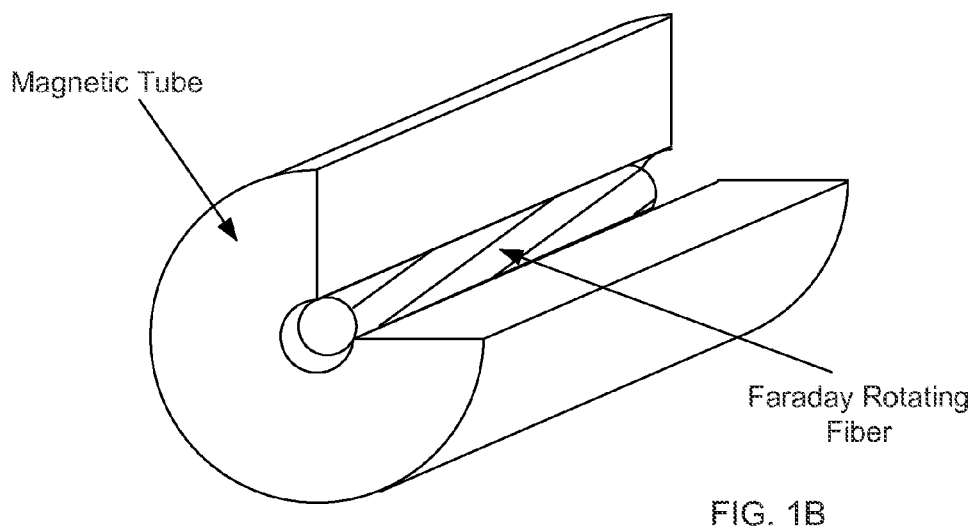
FIG. 1B is a cross-sectional perspective view of an exemplary prior art Faraday rotator.
Figure 2:
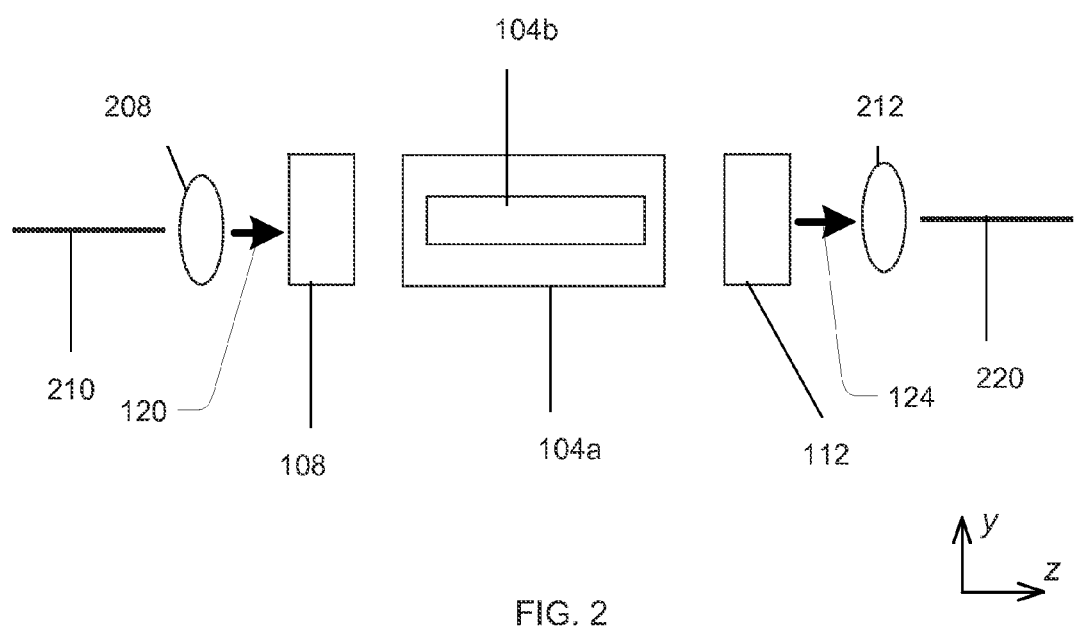
FIG. 2 is a schematic of an exemplary prior art fiber pig-tailed free-space Faraday isolator.

As mentioned above, commercially available Faraday isolators are free-space devices, in which light passes through a region of free-space before being coupled into the Faraday rotator. Simply put, a free-space isolator, such as a conventional Faraday isolator 100 of FIG. 1A, has free space separating its components. Another example, shown in FIG. 2, presents a schematic of another free-space Faraday isolator of the related art, which intakes input light 120 through a coupling optic 208 from an input fiber 210, and which outcouples the light 124 through an optic 212 into an output fiber-optical component 220. This so-called fiber-pigtailing of a conventional bulk free-space Faraday isolator device 100 is employed to facilitate the optical coupling between the device 100 and a portion of the integrated optical system (not shown). FIG. 1B presents, in a cross-section, a perspective view of an exemplary Faraday rotator device of the related art, such as the device 104 of FIGS. 1A and 2.

The development of fiber isolators has become critical given recent advancements in high powered fiber lasers. Fiber lasers generating as much as ten (10) kilowatts of output power have been demonstrated, enabling a wide range of new applications including laser welding, laser cutting, laser drilling, and military defense applications. Even though these fiber lasers have been successfully introduced into industry, much of their operational potential is not realized due to the limitations of the currently-available optical isolators. For the moment, free-space fiber-pigtailed isolators, such as that depicted in FIG. 2, are being used. Incorporation of these free-space isolators into a bigger optical system requires various precise operations (such as, for example, fiber termination, lens alignment, and recoupling of light from a fiber laser source to a fiber optic), each of which reduces the overall performance of the fiber laser. Not only does the use of a free-space isolator limit the power of a fiber laser to about 20 W, but it also reduces the ruggedness and reliability of the overall system, which are two main advantages offered by a fiber laser over a free-space solid-state laser. Embodiments of the invention stem from the realization that an optical isolator implemented as an all-fiber-optic-component device, an optical path which is devoid of free space, not only facilitates the use of such isolator with a fiber laser source by allowing a user to take advantage of full spectrum of operational characteristics of the fiber laser, but also drastically reduces both the cost of production and a probability of malfunction of the resulting all-fiber-optic laser system. Further reductions in the cost of manufacturing and in the weight of the isolator can be achieved through using multiple segments of magnetic material as opposed to the single magnetic tube used in the presently known systems.

The related art does not disclose a fiber-optic based Faraday rotator device or a Faraday isolator system employing such a fiber-optic based Faraday rotator device. This may be due to the fact that fiber-optic elements doped with rare-earth materials conventionally have a doping concentration on the order of a few weight percent or even lower, which corresponds to a low Verdet constant. For example, a 2% (wt.) doped silica glass has a Verdet constant of approximately 1 rad/T·m. A Faraday rotator device employing such a fiber-optic component would require the fiber-optic component to be extremely long, on the order of one meter, before a rotation of a linear polarization vector of light guided by such a fiber-optic component reaches 45 degrees. Accordingly, the dimensions and weight of a magnet cell required to effectuate a performance of such a rotator become cost and operationally prohibitive. In contradistinction with the related art, the present invention employs fiber-optic components doped with rare-earth materials at significantly increased levels of greater than 55% (wt.). In certain embodiments, the doping concentration is greater than 65% (wt.). In other embodiments, the doping concentration is greater than 70% (wt.). In a specific embodiment, the doping concentration is between 55%-85% (wt.). These high levels of doping assure that resulting Verdet constants, of or about 30 rad/T·m facilitate the fabrication of a fiber-optic based Faraday rotator unit on the order of 5 cm.

Embodiments of the present invention employ either a single-mode or a multi-mode fiber that is doped with rare-earth material(s), employed in construction of a Faraday rotator element. In one embodiment, the fiber-optic based Faraday rotator is fusion-spliced with a fiber-based polarizing element (referred to hereinafter as fiber-optic polarizer) to form an all-fiber-optic isolator system. Fusion splicing, as known in the art, facilitates the collinear integration of two optical fiber component end-to-end using heat treatment in such a manner that light passing through a first fiber-optic component enters the second component without passing through free space and with minimized optical losses (i.e., scattering and reflection at a location of the splice is optimized). In a specific embodiment the power input of the Faraday rotator element is greater than 100 watts. Moreover, embodiments of the present invention implement all-fiber-optic polarizing elements which, when used in conjunction with the all-fiber-optic Faraday rotator embodiment, provide a novel all-fiber-optic isolator system. Further, embodiments employ multiple magnets in various arrangement to create a multi-sectioned all-fiber-optic Faraday rotator and isolator.

Figure 3:
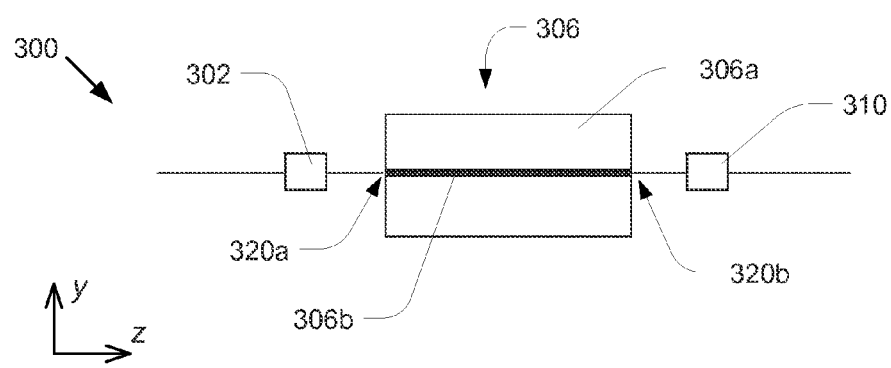
FIG. 3 shows an embodiment of the present invention.

Turning now to FIG. 3, illustrating an embodiment 300 of an all-fiber-optic isolator device including, in the order encountered by light propagating through the device 300 along the z-axis, a first fiber-optic based polarizer 302, a Faraday rotator 306 containing a fiber optic component 306b disposed within a magnetic cell 306a (shaped, for example, as a tube), and a second fiber-optic based polarizer 310. The ends of the fiber-optic components 306b are fusion-spliced with corresponding ends of the polarizers 302 and 310 (as shown schematically by fiber-fusion splicing joints 320a and 320b), thereby creating an all-fiber-optic based device. The fiber optic component 306, used in a Faraday rotation 306, is doped with a rare-earth oxide such as at least one of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$.

Figure 4:
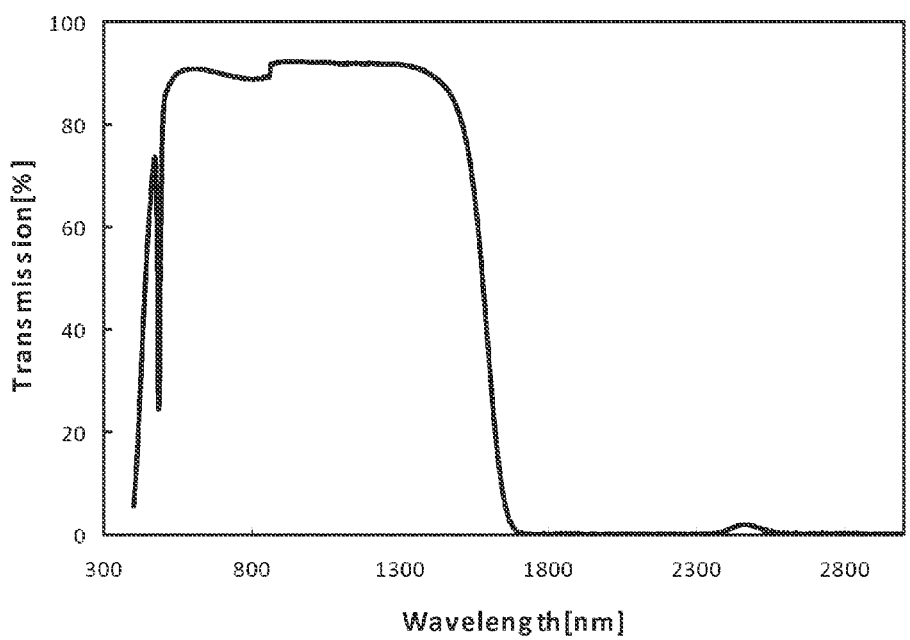
FIG. 4 is a graph of transmission spectrum of terbium-doped glass.

In a specific embodiment, the component 306b includes terbium-doped glass. FIG. 4, showing a transmission spectrum of glass doped with 55 weight-percent of $Tb_2O_3$, illustrates that, while $Tb_2O_3$ exhibits a Verdet constant that is the highest among those corresponding to the rare-earth oxides, this material also absorbs light in spectral regions near 1.5 microns and 2 microns.

Figure 5:
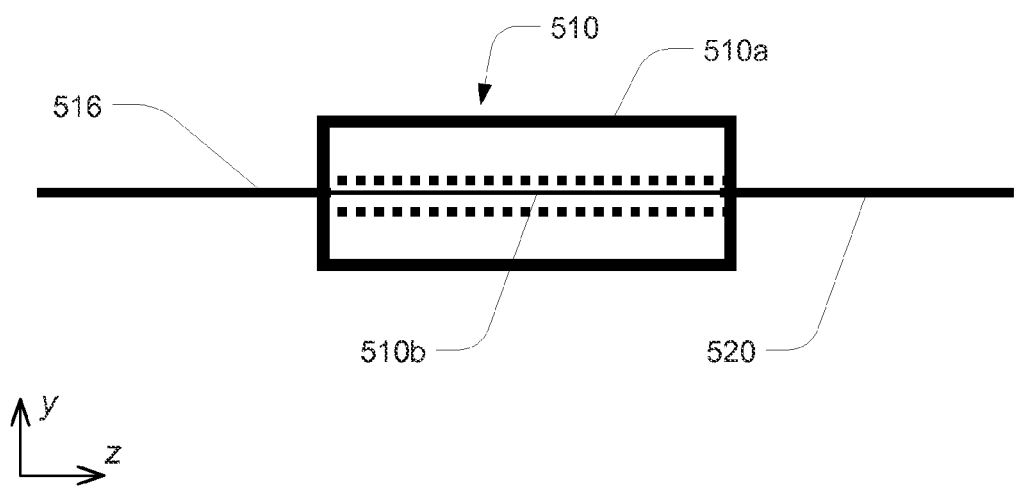
FIG. 5 shows schematically an alternative embodiment of the present invention.
Figure 6:
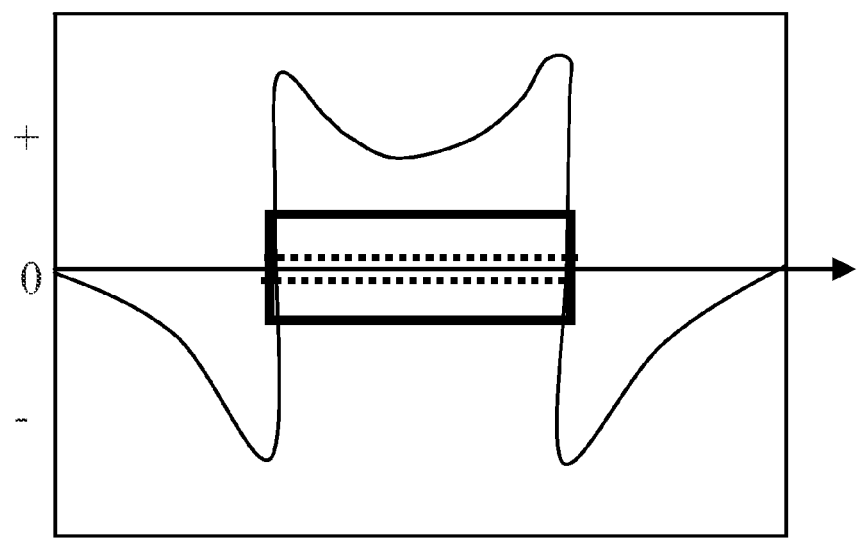
FIG. 6 is a graph of the magnetic filed distribution corresponding to the embodiment of FIG. 5.

An alternative embodiment employing a Faraday-rotator 510 of an all-fiber-optic isolator (not shown) of the invention is depicted schematically in FIG. 5. Here, the degree of Faraday rotation of the polarization vector of light propagating through the embodiment is increased by employing two auxiliary fiber optic components corresponding glass materials of which have Verdet constants with opposite signs. A fiber optic component 510b made of a first glass material is employed inside the magnetic cell 510b as a component of the Faraday rotator 510. Fiber optic components 516 and 520 that are made of a second type of glass material (or, alternatively, of different, second and third, types of glass) are placed at the input and output of the Faraday rotator 506, respectively, and are linearly (end-to-end) integrated, for example via fusion splicing, to create a composite uninterrupted fiber-optic channel that includes a sequential combination of the fibers 516, 510b, and 520. The glass material(s) of each of the fiber-optic components 516 and 520 have Verdet constant(s) of one sign, while the glass material of fiber-optic component 510b has a Verdet constant of a different sign. For example, the glass of fiber-optic component 510b within the magnetic tube 510a has a negative Verdet constant, while glass material(s) of the components 516 and 520 have a positive Verdet constant. In a specific embodiment, the fiber components 516 and 520 having a positive Verdet constant are doped with at least one of Yb2O3, Sm2O3, Gd2O3, and/or Tm2O3, and the fiber component 510b having a negative Verdet constant is doped with Tb2O3. FIG. 6 depicts the magnetic field distribution of the all-fiber isolator of FIG. 5.

It is appreciated that an embodiment where the signs of the Verdet constants are reversed (for example, the fiber material inside the cell 610a having a positive Verdet constant, while the fiber-optic component outside the cell 610a have negative Verdet constants) is also within the scope of the invention.

In further reference to FIG. 3, the material of the fiber-optic component 306b used in a Faraday rotator 306 is doped, in one embodiment, with at least one of $La_2O_3$, $Ga_2O_3$, $Yb_2O_3$, and $Ce_2O_3$. It is preferred that fiber lasers used with such an embodiment of the Faraday rotator operate at wavelengths near 1.5 micron or near 2 microns.

In further reference to FIG. 3, in another related embodiment the fiber-optic component 306b includes a multicomponent. Specifically, the core and/or cladding of such multicomponent-glass fiber optic 306b may contain, for example, silicate glass, germanate glass, phosphate glass, borate glass, tellurite glass, bismuth glass, and/or aluminate glass. In addition or alternatively, the multicomponent glass of the fiber-optic component 306 may include glass network formers, intermediates, and modifiers. In certain embodiments, the network structure of glass includes certain types of atoms that can significantly change the properties of the glass. Cations can act as network modifiers, disrupting the continuity of the network, or as formers, which contribute to the formation of the network. Network formers have a valence greater than or equal to three and a coordination number not larger than four. Network intermediates have a lower valence and higher coordination number than network formers. In a specific embodiment one or more glass network formers of the multicomponent glass of the fiber-optic component 306b of FIG. 3 include at least one of $SiO_2$, $GeO_2$, $P_2O_5$, $B_2O_3$, $TeO_2$, $Bi_2O_3$, and $Al_2O_3$.

TABLE 1

| Composition | $SiO_2$ | $Al_2O_3$ | $B_2O_3$ | $CeO_2$ | $Tb_2O_3$ |
|---|---|---|---|---|---|
| wt % | 9.9 | 0.9 | 7.4 | 0.1 | 72.7 |
| Composition | $SiO_2$ | $Al_2O_3$ | $B_2O_3$ | $CeO_2$ | $Tb_2O_3$ |
| wt % | 13.3 | 13.9 | 10.7 | 0 | 62.2 |
| Composition | $SiO_2$ | $Al_2O_3$ | $B_2O_3$ | $CeO_2$ | $Tb_2O_3$ |
| wt % | 12.2 | 13.3 | 10 | 0 | 64.5 |
| Composition | $SiO_2$ | $Al_2O_3$ | $B_2O_3$ | $CeO_2$ | $Yb_2O_3$ |
| wt % | 14.8 | 16.5 | 10.3 | 0.1 | 58.3 |
| Composition | $SiO_2$ | $Al_2O_3$ | $B_2O_3$ | $CeO_2$ | $Er_2O_3$ |
| wt % | 15.1 | 16.8 | 10.5 | 0.1 | 57.6 |
| Composition | $SiO_2$ | $Al_2O_3$ | $B_2O_3$ | $CeO_2$ | $Yb_2O_3$ |
| wt % | 16 | 17.8 | 11.1 | 0.1 | 55 |

Table 1 presents non-limiting examples of terbium-doped silicate glasses, erbium doped glasses, and ytterbium-doped silicate glasses that can be used with embodiments of the present invention.

Figure 7:
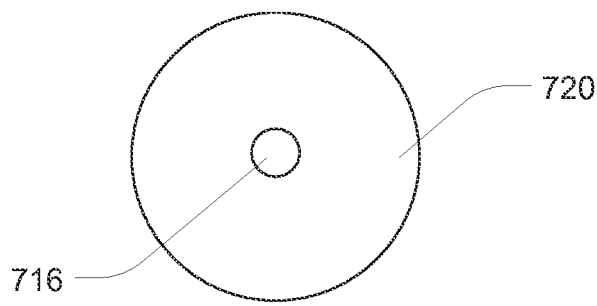
FIG. 7 is a cross-sectional view of an exemplary highly rare-earth doped fiber for use with an embodiment of the present invention.

Turning now to FIG. 7, a cross-sectional view of an exemplary highly rare-earth doped fiber-optic pre-form for fabrication of a fiber-optic component (such as the component 306b of FIG. 3) of a Faraday rotator of the present invention shows a glass core rod 716 is surrounded by a glass cladding tube 720. The outer diameter of the core 716 is the same as the inside diameter of the cladding 720 such that there is no void or gap between the core and the cladding. A fiber-optic component for a fiber-optic based Faraday rotator embodiment of the invention is manufactured using a rod-in-tube fiber drawing technique. The core glass rod 716 is drilled from a bulk highly rare-earth doped glass and the outer surface of the core glass rod 716 is polished to a high surface quality. The cladding glass tube 720 is fabricated from another piece of rare-earth doped glass with a refractive index that is slightly lower than that of the rod 716. The inner and outer surfaces of cladding glass tithe 720 are polished to a high surface quality. After, the rod 716 is placed in the glass tube 720 and then the combination of the two is heated until the tithe shrinks around the rod, followed by a well-known fiber-drawing procedure.

Figure 8:
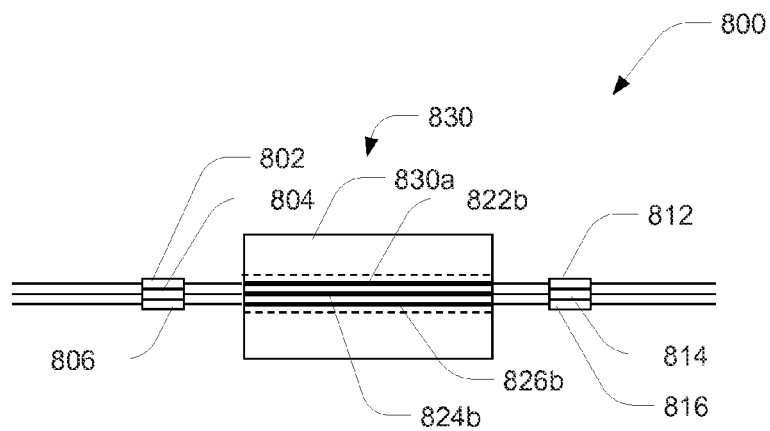
FIGS. 8, 9, 10, 11, and 12 show various embodiments of the present invention.

FIG. 8 illustrates an embodiment 800 employing an array of isolators each of which is structured according to an embodiment of the present invention. As shown, the array 800 includes fiber-optic based polarizers 802, 804, 806, 812, and 814, and 816 linearly integrated (for example, with the use of fusion splicing) with fiber-optic elements 822b, 824b, and 826b positioned inside the magnetic tube 830a of the Faraday rotator device 830. In one embodiment, the inner diameter of the magnetic tube 830a is about 1 mm to about 10 mm. In a specific embodiment, the outer diameter of each of the fiber optic components 822b, 824b, and 826b is about 0.125 mm.

In one embodiment, the fiber-optic components 822b, 824b, and 826b may all be made of the same type of glass doped with the same rare-earth oxides. Alternatively, however, in a different embodiment, these components are made of different types of glass and are doped with different rare-earth oxides. Due to different type of doping, in such an alternative embodiment, these components 822b, 824b, and 826b may be used at different wavelengths. For example, a first fiber-optic component will absorb light in a specific spectral bandwidth while a second component will absorb light in a different spectral bandwidth. In yet another embodiment the fiber-optic components 822b, 824b, and 826b represent fiber optic elements made of the same type of glass but doped with different concentrations of a given rare-earth oxide. In one embodiment fiber-based polarizers 802, 804, 806, 812, 814, and 816 are all the same type of fiber-based polarizers. Generally, however, optical properties of fiber-based polarizers 802, 804, 806, 812, 814, and 816 may differ.

Figure 9:
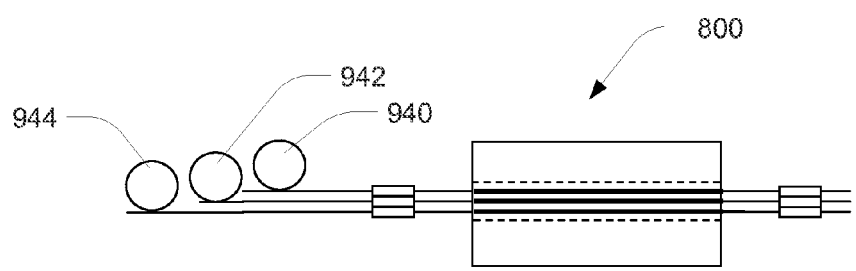

FIG. 9 presents a schematic of an exemplary system comprising the Faraday isolator array 800 of FIG. 8 in conjunction with an array of corresponding fiber lasers. A fiber laser is a laser in which the active gain medium is an optical fiber doped with rare-earth elements. As shown in FIG. 9, each of the optical channels of the Faraday isolator array 800 is arranged in a respective optical communication with a corresponding fiber laser of fiber lasers 940, 942, and 944. While fiber lasers 940, 942, and 944 may be the same, generally they differ in terms of at least one of power output, wavelength of operation, and/or regime of operation (such as, for example, pulse duration).

Figure 10:
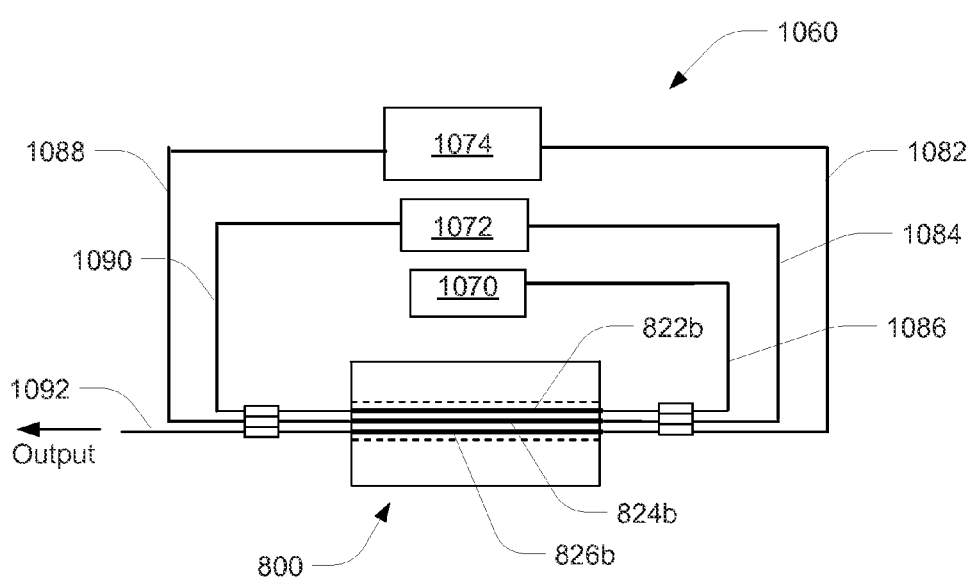

FIG. 10 presents a schematic of an exemplary system comprising the Faraday isolator array 800 of FIG. 8 in optical cooperation with a series of cascade fiber lasers and amplifiers. The embodiment 1060 includes the isolator array 800, cascade fiber laser 1070, and amplifiers 1072 and 1074. The polarization-rotating fiber-optic component 822b of the Faraday rotator device of the isolator array 800 is shown to be sandwiched between and linearly integrated to the laser 1070 and the amplifier 1072. The amplifier 1072, in turn, is optically cooperated with the polarization-rotating fiber-optic component 824b. The component 824b is further sequentially coupled to and linearly integrated with the amplifier 1074 and, through the amplifier 1074, with the polarization-rotating fiber-optic component 826b. In a particular embodiment, fiber-optic portions 1082, 1084, and 1086 and fiber-optic portions 1088, 1090, and 1092 interconnecting various active elements of the embodiment of FIG. 10 have the same optical and material properties as fiber-optic components 822b, 824b, and 826b, respectively. Alternatively, however, these interconnecting portions differ from the polarization-rotating fiber-optic components of the Faraday rotator device in at least one of glass type, doping material, and doping concentration. Generally, Verdet constants of materials from which the interconnecting fiber-optic portions 1082, 1084, 1086, 1088, 1090, and 1092 are made differ from those of the polarization-rotating fiber-optic components 822b, 824b, and 826b of the Faraday rotator device of the embodiment. In addition, the signs of Verdet constants of the interconnecting fiber-optic portions may differ from those of the polarization-rotating fiber-optic components of the Faraday rotator device.

Figure 11:
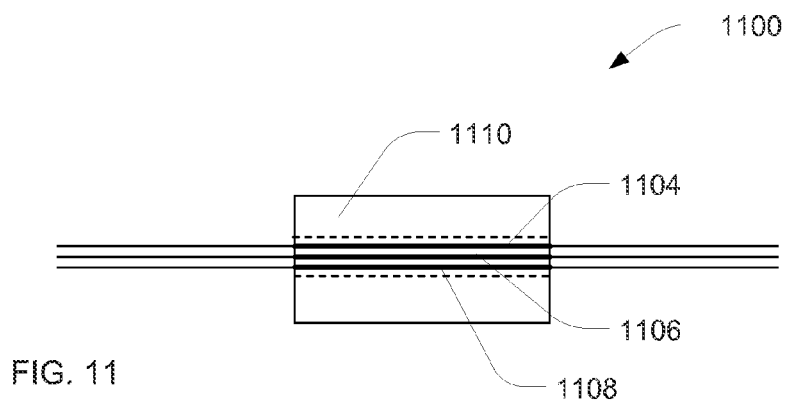

An alternative schematic of an all-fiber-optic Faraday rotator array 1100 is depicted in FIG. 11 to include fiber-optic components 1104, 1106, and 1108 disposed inside a magnetic cell 1110. Each of the polarization-rotating components of the embodiment is further linearly integrated with corresponding fiber-optic elements outside of the magnetic cell 1110 by, for example, fusion splicing, and, in conjunction with the magnetic cell 1110, is adapted to operate as a fiber-optic element rotating the polarization vector of light guided therein via the Faraday effect.

Figure 12:
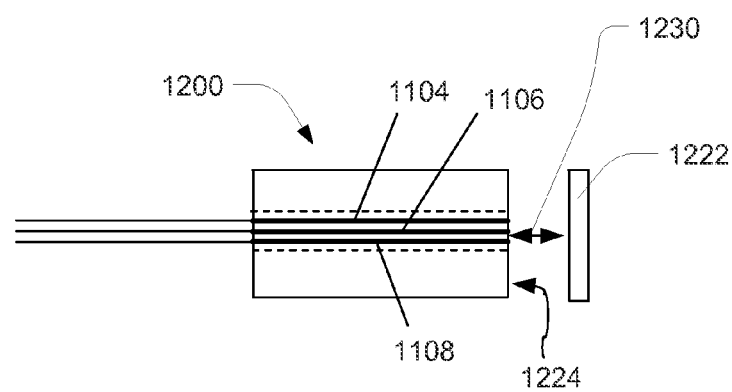

FIG. 12 depicts an exemplary schematic of a Faraday rotator array 1200 optically cooperated at one end with a reflector shown as a general reflective element 1222. The reflective element is adapted to reflect light, propagating in the z-direction along the polarization-rotating fiber-optic components 1104, 1106, and 1108 and to return a portion the same back into the Faraday rotator 1200, as shown by an arrow 1230. In different embodiments, the general reflective element 1222 may include a fiber Bragg grating linearly integrated with the fiber-optic components of the Faraday rotator, a metallic and/or dielectric coatings, disposed on the output facets of the fiber-optic components of the Faraday rotator coating, a stand-alone reflector optionally physically separated from the output 1224, or even a combination thereof. It is appreciated, therefore, that, while the details of optical coupling between the output 1224 and the reflective element 1222 are not shown, such optical coupling may be arranged using any of means known in the art such as, for example, coupling using optical elements such as lenses or butt-coupling, thin-film deposition, or fusion splicing of otherwise independent fiber-optic elements. It is also appreciated, therefore, that a gap between the output 1224 of the Faraday rotator 1200 and the general reflective element 1222 is not intended to represent necessarily free space.

In one embodiment, polarization-rotating fiber-optic components of the Faraday rotator 1200 are made of the same glass material doped with the same rare-earth oxide(s). Generally, however, these fiber-optic components are made of different type(s) of glass doped with different rare-earth oxide(s), in which case they may be used for operating at diMrent wavelengths chosen according to optical properties defined in these components by particular types of dopant(s). Generally, therefore, different fiber-optic components of the Faraday rotator 1200 may function differently, for example, one polarization-rotating fiber-optic component may absorb light in a specific spectral band, while another component may absorb tight at different wavelengths. In yet another embodiment, the components 1104, 1106, and 1108 utilize the same type of glass material but are doped with a rare-earth oxide(s) of different types and/or concentrations.

Figure 13:
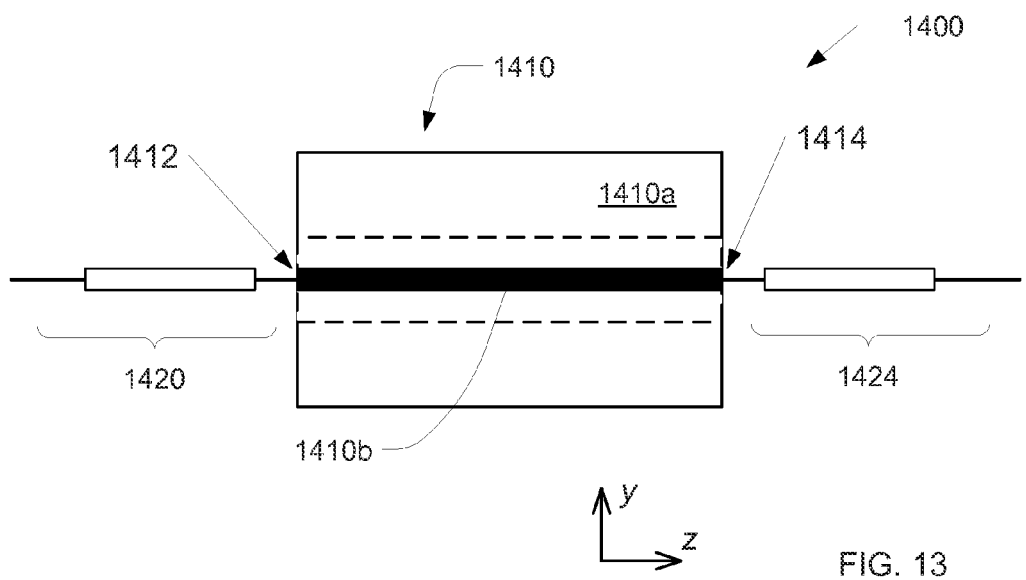
FIG. 13 demonstrates schematically another embodiment of the invention.

An alternative embodiment 1400 of an all-fiber-optic isolator system is shown in FIG. 13 to include an embodiment 1410 of a Faraday rotator that contains, as discussed above, a magnetic cell 1410a such as a tube made of magnetic material and a fiber-optic component 1410b disposed inside and along the cell 1410a. The fiber-optic component is made of glass doped with a rare-earth based material at doping levels of at least 55 wt % to 85 wt % in accordance with an embodiment of the invention. The component 1410b is linearly integrated at each of its ends, respectively corresponding to an input 1412 and an output 1414 of the Faraday rotator 1410, with outside polarizing components 1420 and 1424 at least one of which configured to include beam splitters/combiners utilizing polarization-maintaining (PM) fiber optic elements. The idea of a non-polarizing fiber-optic beam splitter is readily understood in the art and is not discussed in detail herein. Depending on the configuration, a non-polarizing fiber-optic splitter may split the light wave guided by M optical fibers into N>M independent channels, in a multipoint-to-multipoint link arrangement. (The simplest form of non-polarizing fiber-optic splitter is known as a Y-splitter, where M=1, N=2). A non-polarizing fiber-optic combiner is, in the simplest case, a fiber-optic splitter operating in reverse, and multiplexing light waves guided in N independent channels into M<N channels. In contradistinction, embodiments of the present invention take advantage of a fiber-optic beam splitter/combiner the operation of which depends on the state of polarization of light guided within the fiber-optic component.

Figure 14:
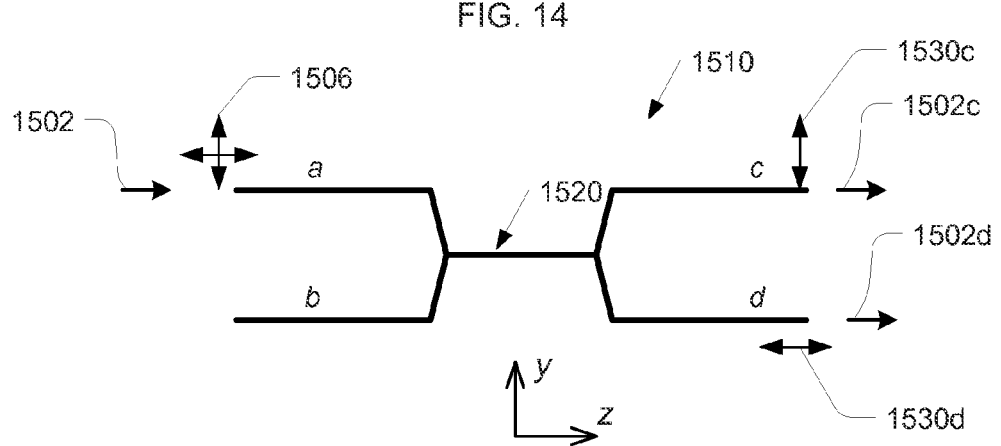
FIGS. 14 and 15 illustrate performance of a polarization-maintaining fiber-optic splitter/combiner.
Figure 15:
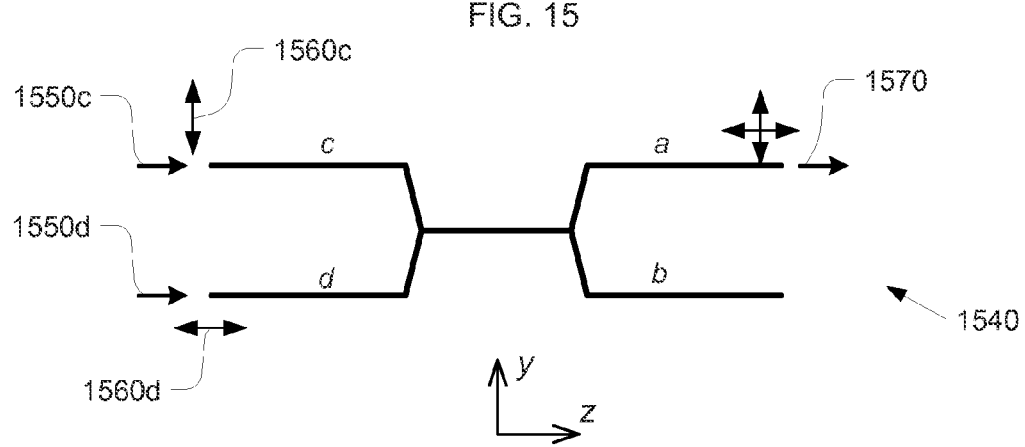

FIGS. 14 and 15 illustrate a simple X-type fiber-optic splitter that employs PM optical fibers. In general, an embodiment of polarizing fiber-optic splitter is configured to spatially separate components of a guided, inside the fiber optic, light wave according to the polarization content of the guided wave, and to couple the guided wave components having orthogonal states of polarization into different branches of the splitter. For example, a light wave 1502 of a given type of polarization (schematically denoted with arrows 1506) that is coupled into an a input branch of the polarizing fiber-optic beam-splitter 1510 to propagate, along the z-direction, towards a junction 1520 of the splitter 1510, is divided, in the junction 1520, such as to appropriately separate components 1502c and 1502d of the wave 1502 having orthogonal states 1530c and 1530d of polarization into different output branches c and d of the splitter. Operation of a fiber-optic beam combiner 1540 that utilizes polarization-maintaining optical fibers is similar. As shown in FIG. 15, such a combiner is configured to bring together (or combine) two guided waves 1550c and 1550d with corresponding orthogonal polarizations 1560c and 1560d coupled, respectively, into the branches c and d of the combiner 1540, and to outcouple the (combined) light wave, having a state 1570 of polarization, into a chosen output branch of the combiner (as shown, branch a).

Figure 16:
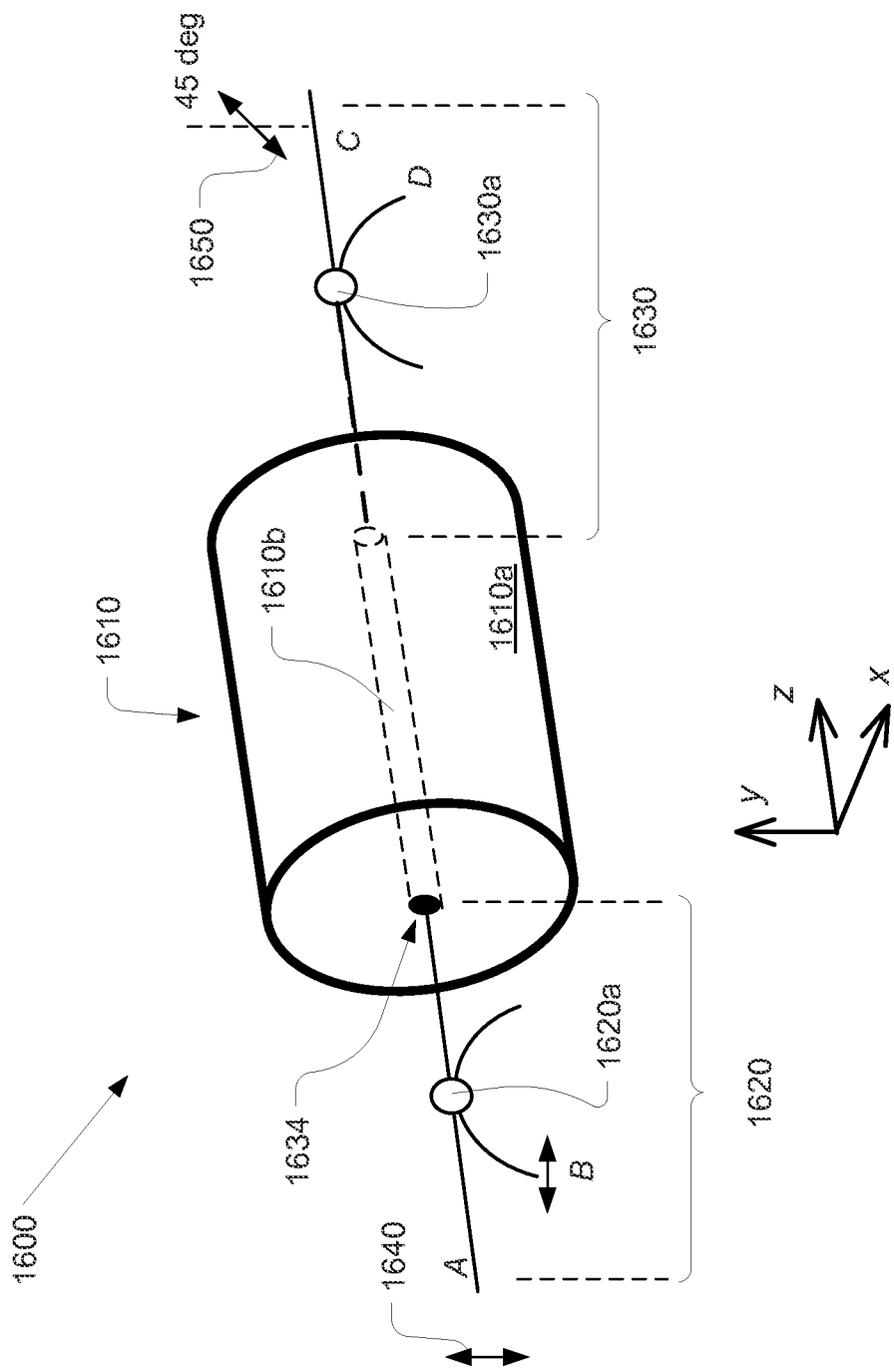
FIG. 16 depicts, in perspective view, another embodiment of the present invention utilizing a splitter/combiner of FIGS. 14 and 15.

As illustrated schematically in FIG. 16, an embodiment 1600 of an all-fiber-optic isolator of the present invention includes a polarization-rotating fiber-optic based Faraday cell 1610 that contains a rare-earth-doped fiber-optic component 1610b disposed along the length of an inside tubular magnetic cell 1610a. The embodiment 1600 further contains input and output polarization-maintaining-fiber based beam splitter/combiner components 1620 and 1630 that are linearly integrated with respectively corresponding input or output of the fiber-optic component 1610 such as to form an uninterrupted fiber-optic link, optically connecting input fiber-optic branches A and B and output fiber-optic branches C and D through a rare-earth doped component 1610b. Different branches of the splitters/combiners 1620 and 1630 are adapted to guide light waves having orthogonal states of polarization.

By way of non-limiting example of operation, and upon forward propagation of light the embodiment 1600 operates as follows. When an input light wave that is linearly polarized, 1640, along a predetermined axis (y-axis as shown) is coupled into the input branch A of the PM fiber-optic based splitter/combiner 1620, the splitter/combiner 1620 transmits this wave, generally in a z-direction, through the junction 1620*a* towards the Faraday rotator 1610. Upon traversing the Faraday rotator 1610, the polarization vector 1650 of the guided light wave is rotated by 45 degrees. The guided light wave is further coupled into the splitter/combiner 1630 configured to transmit light polarized at k degrees with respect to the predetermined axis into the output branch C and further, towards an optical component or system to which the branch C is coupled. Any portion of the light wave back-reflected into the branch C (in, generally, −z direction as shown) will enter a polarization-rotating component 1610*b* of the all-fiber-optic link of the embodiment 1600 upon traversing the junction 1630*a* of the splitter/combiner 1630 and emerge at the end 1634, of the component 1610*b* of the Faraday cell 1610, will have its polarization vector additionally rotated by 45 degrees. The resulting state of the back-reflected light wave at a splice 1634 between the component 1610*b* and the splitter/combiner 1620 is orthogonal to the state of polarization supported by the A branch of the splitter/combiner 1620. Since the branch B of the splitter/combiner 1620 is configured to guide light having polarization orthogonal to that supported by the branch A, the back-reflected light wave is outcoupled through the branch B. A skilled artisan will appreciate the fact that an embodiment 1600 of the invention isolates a laser source coupled into the branch A of the embodiment from the unwanted optical feedback formed in reflection downstream of the optical path.

It should be noted that unconventionally high levels of doping, with rare-earth materials, of glass matrix of the fiber-optic components of the Faraday cell of the invention assure that rotation by 45 degrees or so of the vector of linear polarization of light guided by the fiber-optic components of the Faraday cell is accomplished at propagation lengths of or about several centimeters (for example, about 5 to 10 cm).

Further aspects of the present invention employ the use of multiple magnets with any of the foregoing disclosed Faraday rotators and isolators. The use of multiple magnets versus a single magnet or magnetic tube, allows for the use of separate magnetic segments having a smaller diameter than what is required in single magnet embodiments, thereby reducing the total volume and total weight of the magnetic portion of the Faraday rotator or isolator, Thus, the overall magnetic field intensity per volume is increased, resulting in the need for less magnetic material than in single magnet embodiments to achieve the same degree of rotation and a lower manufacturing cost (because of the reduction in the volume of magnetic material). A further advantage is that smaller diameter magnets are easier to magnetize than the larger magnets required in single magnet embodiments.

Figure 18A:
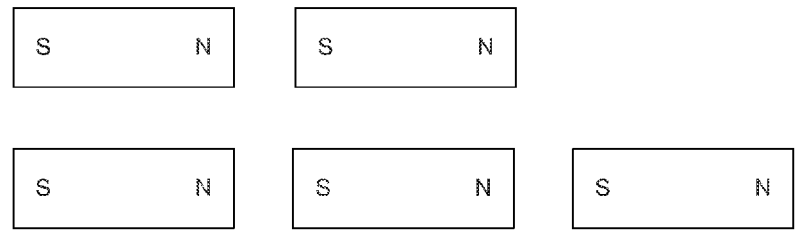
FIGS. 18A, 18B, and 18C schematically illustrate possible magnetic orientations for the magnetic cells of the invention.
Figure 18B:
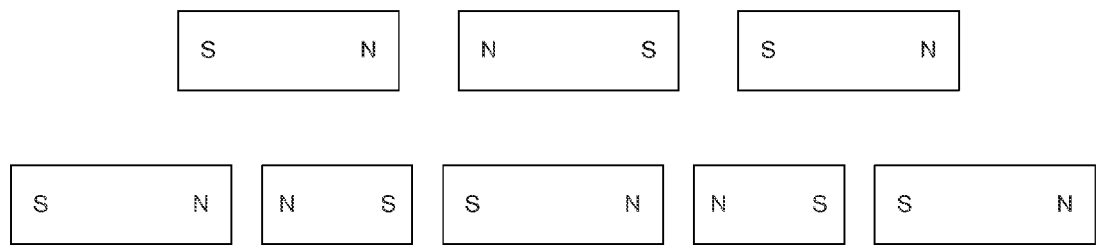

As will be appreciated, when multiple magnets are used, the segments can be arranged in two basic orientations. As shown in FIG. 18A, the magnets can be arranged such that the opposite magnetic poles are facing each other. In this arrangement each magnet has the same magnetic orientation. Conversely, as show in FIG. 18B, the magnets can be arranged such that the same magnetic poles are facing each other. In this orientation each magnet has an opposing magnetic orientation. Other possible orientations are permutations of what is shown in FIGS. 18A and 18B. Specifically, some of the magnets could be arranged such that the magnetic poles are facing each other while others are arranged such that the opposite poles are facing each other. A schematic of such an arrangement is shown in FIG. 18C.

Figure 18C:
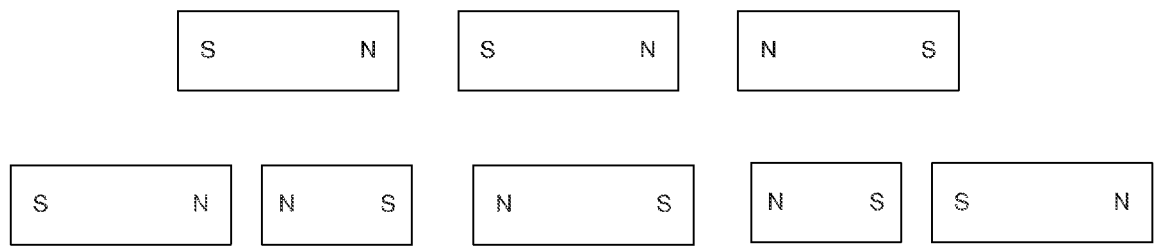

As is shown in FIGS. 18A, 18B, and 18C two, three, four, or even more magnets can be used. Specifically in preferred embodiments, however, three magnets are used. Further, the magnets themselves may be of the same or differing sizes, as is shown in FIG. 18B.

Figure 18D:
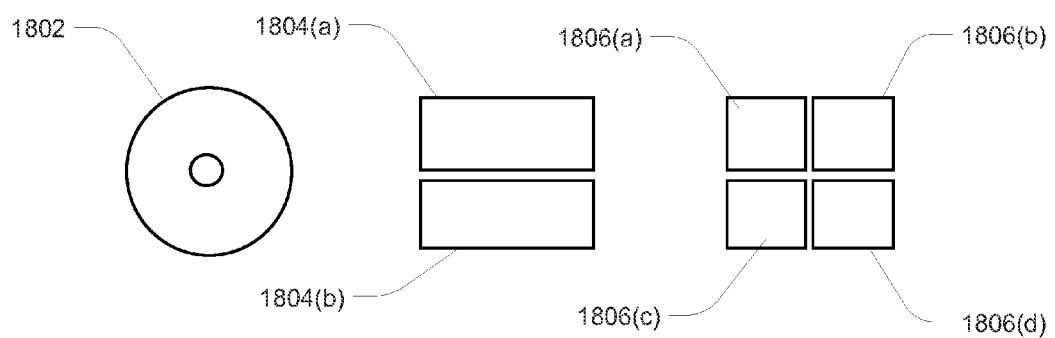
FIG. 18D schematically illustrates the cross section of the magnetic cells used in the invention.
Figure 19A:
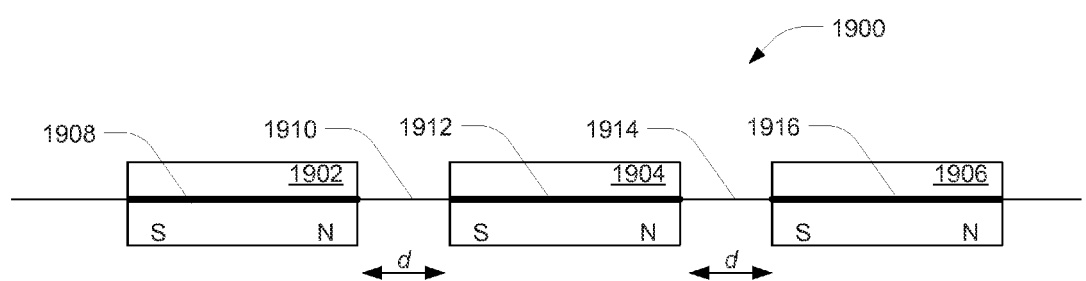
FIGS. 19A and 19B are schematic illustrations of Faraday rotators according to the present invention.

Referring to FIG. 18D, in certain embodiments the magnetic segments used are separate sections of a magnetic tube, each having cross-section 1802. In other embodiments, the magnetic segments used are not separate sections of a magnetic tube and instead have rectangular cross-sections, such as cross-sections 1804(*a*) and 1804(*b*), or square cross-sections, such as cross-sections 1806(*a*)-(*d*). In still other embodiments, separate magnetic segments having other cross-sections are used. Further, in certain embodiments a mixture of magnets having various cross-sections are used. Thus, by way of example and not limitation, one portion of the fiber is surrounded by a segment of a magnetic tube while another portion is surrounded by magnetic segments having a square cross-section.

Where the separate magnetic segments are aligned such that the opposite poles of the magnets face one another, as depicted in FIG. 18A, Faraday rotating fibers with the same direction of rotation are placed in the magnets while fibers having the opposite Faraday rotating direction or fibers with very small Verdet constants (i.e., fibers having a small rotation angle under the same magnetic field flux density) are placed in between the magnet. A schematic of an exemplary embodiment of such a Faraday rotator of an all-fiber-optic isolator is illustrated in FIG. 19A. As can be seen, Faraday rotator 1900 comprises fiber optic components 1908, 1912, and 1916 within magnetic cells 1902, 1904, and 1906 respectively, where the magnetic cells are oriented such that opposite magnetic poles are facing one another. Fiber optic components 1908, 1912, and 1916 each have the same Faraday rotational direction. In certain embodiments, components 1908, 1912, and 1916 each comprise the same glass materials. In other embodiments, fiber optic components 1908, 1912, and 1906 comprise different glass materials. In still other embodiments, fiber optic components 1908, 1912, and 1906 each have a different doping concentration. As stated, fiber optic components 1910 and 1914, located between the magnetic segments, each have the opposite Faraday rotational direction from fiber optic components 1908, 1912, and 1906 or have a very small Verdet constant. By way of example and not limitation, in certain embodiments, fiber optic components 1908, 1912, and 1906 comprise a Tb-doped fiber while fiber optic components 1910 and 1914 are undoped fibers (and thus have a very small Verdet constant). Alternatively, by way of example and not limitation, fiber optic components 1910 and 1914 are La-doped fibers, which have the opposite rotating direction from Tb-doped fiber optic components 1908, 1912, and 1906.

For the embodiment depicted in FIG. 19A, magnetic cells 1902, 1904, and 1906 must be separated to a certain distance d otherwise the magnetic field intensity around fiber optic components 1908, 1912, and 1916 will be reduced. In certain embodiments this distance is half the length of the magnetic cell. In other embodiments distance d is more or less than half the length of the magnetic cell. In still other embodiments where two or more magnetic cells are used, the distance between two cells may vary.

Figure 19B:
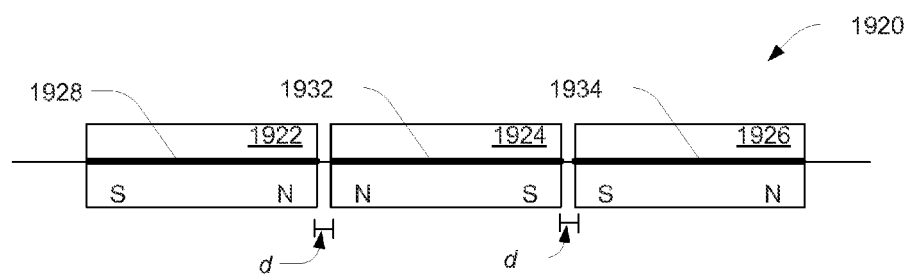

In embodiments where the separate magnetic segments are aligned such that the same poles of the magnets face one another, as depicted in FIG. 18B, Faraday rotating fibers having a high Verdet constant are placed in every other magnetic segment while the intervening segments have fibers having the opposite Faraday rotating direction or a very small Verdet constant. An embodiment of such a Faraday rotator of an ail-fiber-optic isolator is illustrated in FIG. 19B. As can be seen in FIG. 19B, Faraday rotator 1920 comprises fiber optic components 11928, 1932, and 1934 within magnetic cells 1922, 1924, and 1926 respectively, where the magnetic cells are oriented such that the same magnetic poles are facing one another. In the illustrated embodiments, fiber optic components 1928 and 1934 have a high Verdet constant and the same Faraday rotational direction. In certain embodiments, fiber optic components 1928 and 1934 comprise the same glass materials. In other embodiments, fiber optic components 1928 and 1934 comprise different glass materials. In still other embodiments, fiber optic components, 1928 and 1934 have different doping concentrations.

In contrast to the embodiment shown in FIG. 19A, in certain embodiments fiber optical component 1932 of Faraday rotator 1920 will have the opposite Faraday rotating direction from fiber optic components 1928 and 1934. In other embodiments, fiber optical component 1932 has a very small Verdet constant.

While the embodiment illustrated in FIG. 19B has been described such that the fibers having a high Verdet constant are in the first and third magnetic cells, cells 1922 and 1926, in other embodiments the reverse may be done. More specifically in other embodiments the fiber within the second cell may have a very high Verdet constant while the fibers in the first and third magnetic cell may have a very low Verdet constant or the opposite Faraday rotating direction. In such an embodiment the magnetic cells may have a larger diameter than what would be required for the embodiment illustrated in FIG. 19B because only one section of the magnet is causing the desired rotation.

In embodiments were the magnetic cells are oriented such that the same poles are facing each other, as in FIG. 19B, the magnetic cells can be separated by a distance d or can be forced in direct contact. In the latter situation, because of the repulsion forces the magnets will need to be fixed into place using screws, adhesive materials, or other means. One advantage of the embodiment shown in FIG. 19B over the embodiment of FIG. 19A is that the spacing between the magnets can be as small as possible. This close contact can enhance the magnetic field in both the connecting magnets. Moreover, the overall physical length of the Faraday rotator will be smaller, which is advantageous for many applications.

While Faraday rotators 1900 and 1920 have each been illustrated with three magnetic cells, it will be appreciated that this is for clarity and is not meant to be limiting. In each embodiment more or less than three magnetic cells can be used. In embodiments where the magnetic cells are arranged so that the same magnetic poles face each other, such as with Faraday rotator 1920, it is preferable that an odd number of magnetic cells be used.

For the arrangement depicted in either FIG. 19A or 19B, while the magnetic cells have been depicted for clarity as being of the same size and having the same cross-sectional diameter, this is not intended as a limitation. In certain embodiments, separate magnetic segments having different lengths or different cross-sectional diameter are used. Furthermore, the magnetic cells used may be of the same magnetic material or may be of different magnetic materials.

Figure 20:
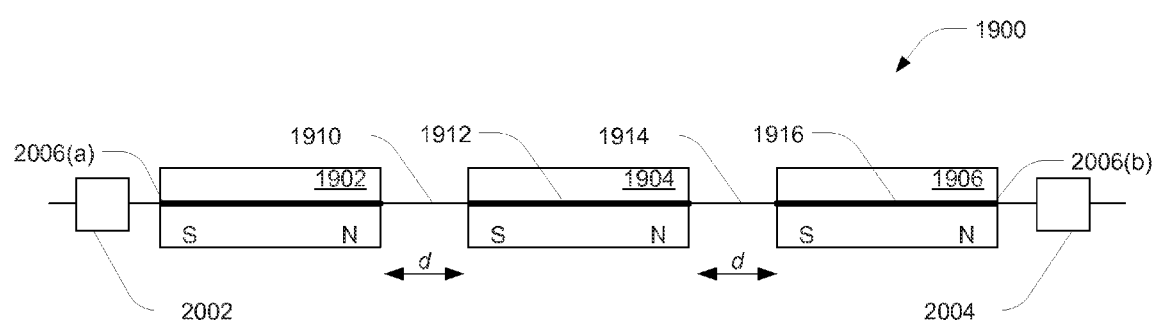
FIG. 20 is a schematic illustration of a Faraday isolator according to the present invention.

In certain embodiments, the ends of Faraday rotator 1900 or 1920 are further connected with a fiber-optic based polarizer to form a Faraday isolator. A schematic of such an embodiment using Faraday rotator 1900 is depicted in FIG. 20, wherein fiber-optic based polarizer 2002 is connected to a first end of Faraday rotator 1900 and fiber-optic based polarizer 2004 is connected to the other end. As with previously described embodiments, the ends of fiber optic components 1908 and 1916 are fusion-spliced with corresponding ends of the polarizers 2002 and 2004 (as shown schematically by fiber-fusion splicing joints 2006(a) and 2006(b)), thereby creating an all fiber-optic based device.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope. For example, embodiments implementing arrays of all-fiber-optic based isolators employing PM fiber-optic beam splitter/combiners can be readily configured for use with a plurality of laser sources (such as fiber lasers, for example) and fiber-optic amplifiers.

Figure 17A:
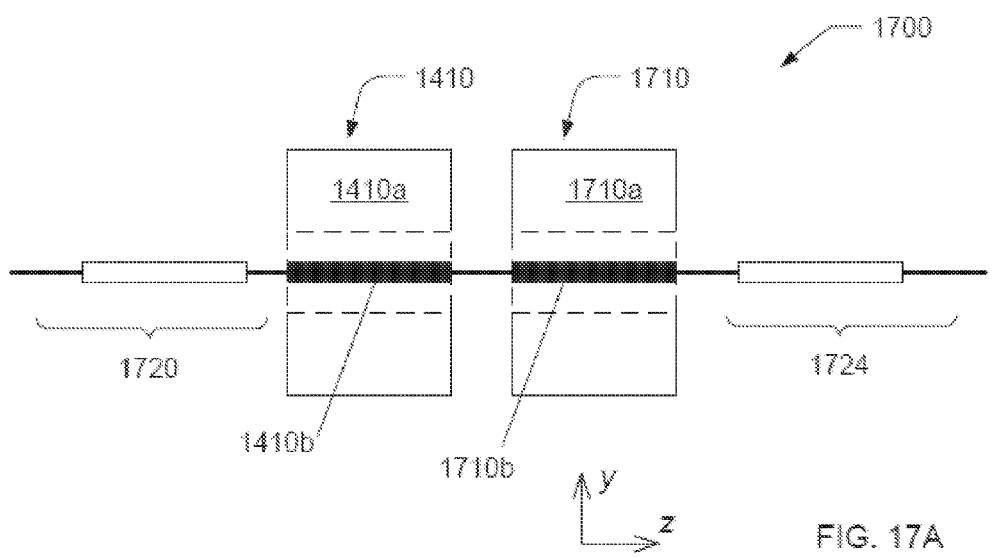
FIGS. 17A and 17B show schematically alternative embodiments of the present invention.
Figure 17B:
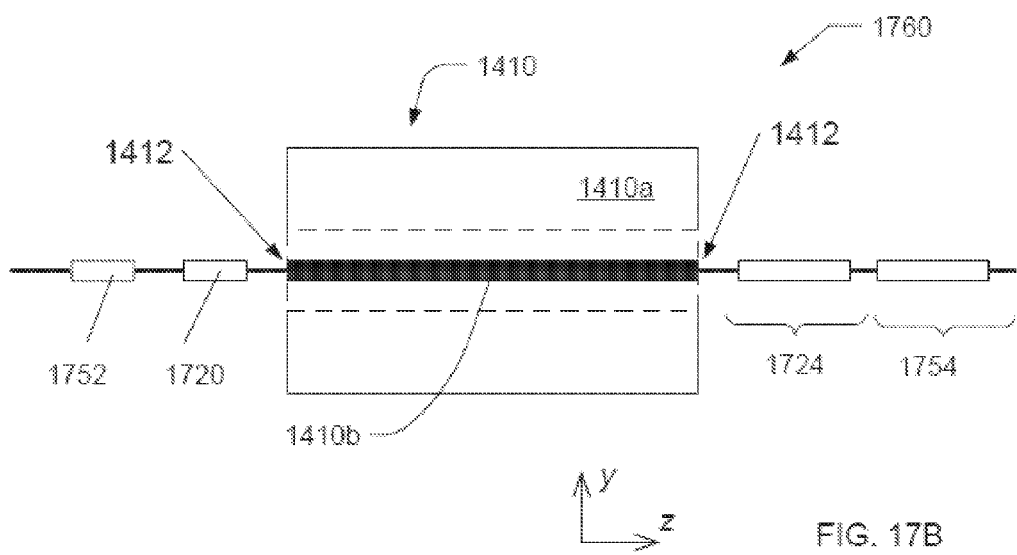

While the preferred embodiments of the present invention have been illustrated in detail, it should be apparent that modifications and adaptations to those embodiments may occur to one skilled in the art without departing from the scope of the present invention as set forth in the following claims. For example, an alternative embodiment of the invention may include multiple Faraday rotators 1410, 1710 (each of which contains a corresponding polarization-rotating fiber optic component 1410b, 1710b enclosed in a corresponding magnetic cell 1410a, 1710a). Alternatively or in addition, an embodiment of the invention may include multiple polarization-maintaining fiber-optic beam-splitter, arranged in sequence, or in parallel, or both sequentially and in parallel with one another. An example of a sequence of multiple PM fiber-optic beam-splitters 1720, 1752 and 1724, 1754 used with an embodiment 1760 is shown in FIG. 17B.

What is claimed is:

1. A fiber-optic device having a light path devoid of free-space regions, the fiber-optic device comprising:
   a first multicomponent glass optical fiber comprising:
      a core having a first doping concentration of 55%-85% (wt./wt.) of a first rare-earth oxide; and
      a cladding having a second doping concentration of 55%-85% (wt./wt.) of a second rare-earth oxide;
      wherein:
         the first rare-earth oxide and the second rare earth oxide are selected from the group consisting of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$; and
         a refractive index of the cladding is less than a refractive index of the core; and
   a plurality of magnetic cells each formed to include a bore extending there through, wherein the first fiber is disposed in the bore of one of the plurality of magnetic cells.

2. The fiber-optic device of claim 1, wherein each of the plurality of magnetic cells have a magnetic orientation, wherein the plurality of magnetic cells are positioned in the same magnetic orientations.

3. The fiber-optic device of claim 2, further comprising:
   a second multicomponent glass optical fiber disposed in the bore of another one of the plurality of magnetic cells, wherein the first and second fibers are the same; and
   a third glass optical fiber having a first end and a second end, wherein the first end is fusion spliced with the first fiber and the second end is fusion spliced with the second fiber.

4. The fiber-optic device of claim 3, wherein the third fiber has a property selected from the group consisting of:

a second rotation angle, wherein the first fiber has a first rotation angle, wherein the first wangle is greater than the second rotation angle under a magnetic field flux density; and a second rotating direction, wherein the first fiber has a first rotating direction that is opposite the second rotating direction.

5. The fiber-optic device of claim 2, wherein each of the plurality of magnetic cells have a length, wherein each of the plurality of magnetic cells are separated by a distance equal to at least one half the length.

6. The fiber-optic device of claim 1, wherein each of the plurality of magnetic cells have a magnetic orientation, wherein the plurality of magnetic cells are positioned in opposing magnetic orientation.

7. The fiber-optic device of claim 6, wherein each of the plurality of magnetic cells are in physical contact with at least one other of the plurality of magnetic cells.

8. The fiber-optic device of claim 6, wherein each of the plurality of magnetic cells are separated.

9. The fiber-optic device of claim 6, further comprising a second fiber disposed in another bore of one of the plurality of magnetic cells, the second fiber having a property selected from the group consisting of:

a second rotation angle, wherein the first fiber has a first rotation angle that is greater than the second rotation angle under a magnetic field flux density; and a second rotating direction, wherein the first fiber has a first rotating direction that is opposite the second rotating direction.

10. The fiber-optic device of claim 9, further comprising a third multicomponent glass optical fiber disposed in the bore of another one of the plurality of magnetic cells, wherein the first fiber and the third fiber are the same, wherein the second fiber has a first end and a second end, wherein the first end is fusion spliced with the first fiber wherein the second end is fusion spliced with the third fiber.

11. The fiber-optic device of claim 1 having a first port and a second port, the fiber-optic device further comprising a first fiber-based polarizer defining the first port and a second fiber-based polarizer defining the second port.

12. The fiber-optic device of claim 1, wherein a first one of the plurality of magnetic cells comprises a first magnetic material, wherein a second one of the plurality of magnetic cells comprises a second magnetic material, wherein the first and second magnetic material differ.

13. The fiber-optic device of claim 1, wherein each of the plurality of magnetic cells have a magnetic orientation, wherein a first one of the plurality of magnetic cells is positioned in the same magnetic orientation as a second one of the plurality of magnetic cells, wherein a third one of the plurality of magnetic cells is positioned in the opposite magnetic orientation as the second one of the plurality of magnetic cells.

14. The fiber-optic device of claim 1, wherein the first rare-earth oxide is selected from the group consisting of $La_2O_3$, $Ga_2O_3$, $Yb_2O_3$, and $Ce_2O_3$, wherein the fiber-optic device further comprises a fiber laser wavelength between 1.5 microns to 2.5 microns.

15. A fiber-optic device having a light path devoid of free-space regions, the fiber-optic device comprising:

first and second multicomponent glass optical fibers, the first and second fibers each comprising:

a core having a first doping concentration of 55%-85% (wt./wt.) of a first rare-earth oxide; and a cladding having a second doping concentration of 55%-85% (wt./wt.) of a second rare-earth oxide;

wherein:

the first rare-earth oxide and the second rare earth oxide are selected from the group consisting of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$; and a refractive index of the cladding is less than a refractive index of the core; and a plurality of magnetic cells each formed to include a bore extending there through, wherein the first fiber is disposed in the bore of one of the plurality of magnetic cells and the second fiber is disposed in the bore of another one of the plurality of magnetic cells.

16. The fiber-optic device of claim 15, wherein the core of the first fiber is doped with a different rare earth oxide than the core of the second fiber.

17. The fiber-optic device of claim 15, wherein each of the plurality of magnetic cells have a magnetic orientation, wherein the plurality of magnetic cells are positioned in the same magnetic orientation, wherein the fiber-optic device further comprises a third glass optical fiber having a first end and a second end, wherein the first end is fusion spliced with the first fiber and the second end is fusion spliced with the second fiber, wherein the third fiber has a property selected from the group consisting of:

a second rotation angle, wherein the first fiber has a first rotation angle, wherein the first angle is greater than the second rotation angle under a magnetic field flux density; and a second rotating direction, wherein the first fiber has a first rotating direction that is opposite the second rotating direction.

18. The fiber-optic device of claim 15, wherein each of the plurality of magnetic cells have a magnetic orientation, wherein the plurality of magnetic cells are positioned in opposing magnetic orientations, the fiber-optic device further comprising a third fiber disposed in another bore of one of the plurality of magnetic cells, wherein the third fiber has a first end and a second end, wherein the first end is fusion spliced with the first fiber wherein the second end is fusion spliced with the second fiber, wherein the third fiber has a property selected from the group consisting of:

a second rotation angle, wherein the first fiber has a first rotation angle that is greater than the second rotation angle under a magnetic field flux density; and a second rotating direction, wherein the first fiber has a first rotating direction that is opposite the second rotating direction.

19. The fiber-optic device of claim 15 having a first port and a second port, the fiber-optic device further comprising a first fiber-based polarizer defining the first port and a second fiber-based polarizer defining the second port.

20. A fiber-optic device having a light path devoid of free-space regions, the fiber-optic device comprising:

a first multicomponent glass optical fiber comprising:

a core having a first doping concentration of 55%-85% (wt./wt.) of a first rare-earth oxide; and a cladding having a second doping concentration of 55%-85% (wt./wt.) of a second rare-earth oxide;

wherein:

the first rare-earth oxide and the second rare earth oxide are selected from the group consisting of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$; and a refractive index of the cladding is less than a refractive index of the core;

a plurality of magnetic cells each formed to include a bore extending there through, wherein the first fiber is disposed in the bore of one of the plurality of magnetic cells;

a first polarizer at a first port; and a second polarizer at a second port;

wherein a polarization of light transmitted through the fiber-optic device is rotated 40 to 50 degrees.

21. The fiber-optic device of claim 20 further comprising a second glass optical fiber and a third optical glass fiber, wherein:

each of the plurality of magnetic cells have a magnetic orientation, wherein the plurality of magnetic cells are positioned in the same magnetic orientation;

the second fiber is disposed in the bore of another one of the plurality of magnetic cells, wherein the first and second fibers are the same; and the third fiber has a first end and a second end, wherein the first end is fusion spliced with the first fiber and the second end is fusion spliced with the second fiber; and the third fiber has a property selected from the group consisting of:

a second rotation angle, wherein the first fiber has a first rotation angle, wherein the first angle is greater than the second rotation angle under a magnetic field flux density; and a second rotating direction, wherein the first fiber as a first rotating direction that is opposite the second rotating direction.

22. The fiber-optic device of claim 20 further comprising a second glass optical fiber fusion spliced with the first fiber, wherein:

each of the plurality of magnetic cells have a magnetic orientation, wherein the plurality of magnetic cells are positioned in opposing magnetic orientations;

the second fiber is disposed in another bore of one of the plurality of magnetic cells; and the second fiber has a property selected from the group consisting of:

a second rotation angle, wherein the first fiber has a first rotation angle that is greater than the second rotation angle under a magnetic field flux density; and a second rotating direction, wherein the first fiber has a first rotating direction that is opposite the second rotating direction.

* * * * *